(12) United States Patent
Nauertz (10) Patent No.: US 8,518,268 B1
(45) Date of Patent: Aug. 27, 2013

(54) METHOD AND APPARATUS FOR MOBILE WATER FILTRATION

(75) Inventor: Paul A. Nauertz, Antioch, IL (US)

(73) Assignee: Flocate Industries, Inc., Antioch, IL (US)

( * ) Notice: Subject to any disclaimer, the term of this patent is extended or adjusted under 35 U.S.C. 154(b) by 523 days.

(21) Appl. No.: 12/911,410

(22) Filed: Oct. 25, 2010

Related U.S. Application Data (60) Provisional application No. 61/279,594, filed on Oct. 23, 2009.

(51) Int. Cl.
*C02F 1/52* (2006.01)
*B01D 3/04* (2006.01)

(52) U.S. Cl.
USPC ............................ 210/738; 210/206; 210/219

(58) Field of Classification Search
USPC .................. 210/738, 206, 219, 702, 723, 736
See application file for complete search history.

(56) References Cited

U.S. PATENT DOCUMENTS

| | | | |
|---|---|---|---|
| 654,965 | A | 7/1900 | Franke |
| 1,343,471 | A * | 6/1920 | Otterson ...................... 210/241 |
| 2,289,669 | A | 7/1942 | Maxton |
| 3,363,761 | A | 1/1968 | Groth et al. |
| 3,444,077 | A | 5/1969 | Finch |
| 3,923,655 | A | 12/1975 | McKinney |
| 4,113,616 | A | 9/1978 | Kaes |
| 4,333,835 | A | 6/1982 | Lynch |
| 4,534,869 | A | 8/1985 | Seibert |
| 4,536,286 | A | 8/1985 | Nugent |
| 4,571,301 | A | 2/1986 | Inskeep, Jr. |
| 4,836,921 | A | 6/1989 | Hahn et al. |
| 5,112,479 | A | 5/1992 | Srimongkolkul |
| 5,312,551 | A | 5/1994 | Perron et al. |
| 5,403,474 | A | 4/1995 | Emery |
| 5,407,561 | A | 4/1995 | Iida et al. |
| 5,407,562 | A | 4/1995 | Baldino |
| 5,520,803 | A | 5/1996 | Russell et al. |
| 5,571,408 | A * | 11/1996 | Rising ....................... 210/167.29 |
| 5,626,748 | A | 5/1997 | Rose |
| 6,059,977 | A * | 5/2000 | Rowney et al. ................ 210/710 |

(Continued)

OTHER PUBLICATIONS

Stormwater, The Journal for Surface Water Quality Professionals. "A Temporary Water Treatment System for Construction Runoff at a Planned Community Development." Date: Jul.-Aug. 2004.

(Continued)

*Primary Examiner* — Ana Fortuna
*Assistant Examiner* — Nader Hossaini
(74) *Attorney, Agent, or Firm* — Jansson Munger McKinley & Shape Ltd.

(57) ABSTRACT

A mobile water filtration apparatus and method for on-site removal of contaminants from raw water comprising a portable platform and a first settling tank secured with respect to the platform. The settling tank includes flocculating agent and a lower portion into which sediment settles. A sloped trough is secured with respect to the platform and has an upper end which receives the flocculating-agent-containing water, a lower end, a plurality of spaced-apart walls between upper and lower ends which define a serpentine flow path, and a plurality of agitators between the walls. A terminal settling tank receives water from the trough lower end and includes a lower portion into which sediment settles and an outlet along an upper portion through which treated water flows. An exemplary apparatus includes a gate corresponding to each wall and defining an opening through which water flows.

25 Claims, 5 Drawing Sheets

(56) References Cited

U.S. PATENT DOCUMENTS

| | | |
|---|---|---|
| 6,099,722 A | 8/2000 | Tittlebaum et al. |
| 6,619,118 B1 | 9/2003 | Keck |
| 6,734,282 B1 | 5/2004 | Wagener et al. |
| 6,899,808 B1 | 5/2005 | Ott |
| 7,157,010 B1 | 1/2007 | Wolfe |
| 7,431,835 B2 | 10/2008 | Lack |
| 7,459,077 B2 | 12/2008 | Staschik |
| 7,553,412 B2 | 6/2009 | Lack |
| 2003/0164341 A1 | 9/2003 | Use et al. |
| 2005/0247647 A1 | 11/2005 | Hills |
| 2007/0084808 A1 | 4/2007 | Williamson et al. |

OTHER PUBLICATIONS

AquaShield Inc. "AquaShield's New Industrial Specific Water Treatment System." <<www.aquashieldinc.com>> Date: Copyright 2005-2007.

Applied Polymer Systems, Inc. "APS 700 Series Floc Log." <<www.siltstop.com>> Date: Copyright 2002.

Applied Polymer Systems, Inc. "Floc Log." <<www.siltstop.com>> Date: Undated.

Applied Polymer Systems, Inc. "Water Treatment." <<www.siltstop.com>> Date: Copyright 2002.

* cited by examiner

METHOD AND APPARATUS FOR MOBILE WATER FILTRATION

RELATED APPLICATION

This application claims the benefit of U.S. Provisional Application Ser. No. 61/279,594, filed Oct. 23, 2009, the entire contents of which are incorporated herein by reference.

FIELD

The field relates generally to water filtration systems and, more particularly, to mobile water filtration systems for removing fine particles and contaminants from raw water in on-site soil and environmental disturbances operations.

BACKGROUND

Construction site operators are increasingly called upon to manage on-site stormwater which is a frequent on-site condition during construction and other earthwork projects. This demand is particularly strong in light of established and developing federal and state regulations intended to preserve and protect the quality of the nation's surface waters.

The Clean Water Act (formerly known as the Federal Water Pollution Control Act) is the primary federal legislation that protects the nation's surface waters. The Clean Water Act was amended to include the Water Quality Act of 1987, which addressed, in part, storm water discharge and required the Environmental Protection Agency (EPA) to develop a comprehensive phased program to regulate storm water discharge. The EPA is the governing authority in five states, namely, Massachusetts, New Hampshire, New Mexico, Idaho and Alaska. Other states have followed the national guidance adopting comprehensive state environmental protection acts which codify many of the federal environmental protection acts, including the federal Clean Water Act.

The three phases of the Clean Water Act have already been enacted. Phase I applied to stormwater discharges from medium and large municipal separate storm sewer systems and Phase II applied to small municipal separate storm sewer systems. Phase III, which took effect on Feb. 1, 2010, has an impact on nearly every construction and other development project. The non-numeric effluent limitations became effective on Feb. 1, 2010. Thereafter and over the next four years, the EPA is phasing in the specific numeric limitations and associated monitoring requirements applicable to large sites. Construction sites that disturb ten or more acres at one time were given four years to begin compliance. No later than Aug. 1, 2011, all sites that disturb twenty or more acres of land at one time are required to comply with the turbidity limitations. The EPA has estimated that the construction industry will spend $2 billion in new costs to comply with the new regulations.

Phase III of the Clean Water Act, among other things, establishes national clean water standards, known as effluent limitation guidelines, for the construction and development industry. One aspect of the upcoming federal guidelines is a numeric limitation on the amount of Nephelometric Turbidity Units (NTUs) which are allowable in stormwater discharge from construction sites. The turbidity limit is a measure of the quality of the water and it applies to active treatment systems which include polymer-assisted water clarification. Turbidity is measured in NTUs and is a very important parameter to monitor because the levels of NTUs in a body of water correlate to the clarity and quality of the water. Failure to comply with these new guidelines and water quality standards with respect to limits of NTUs in stormwater discharge from construction sites will carry significant penalties.

Construction activities (including other land-disturbing activities) that disturb between one and five acres or more, and smaller sites that are part of a larger, common plan of development are regulated under the National Pollution Discharge Elimination System (NPDES) stormwater program. Most states are authorized to implement the NPDES permit program, including the stormwater program. Under such programs, operators of regulated construction sites are required to develop and implement stormwater pollution prevention plans and to obtain permit coverage (the EPA refers to them as Construction General Permits, or CGP, and many states require similar permits) from an authorized state or from the EPA. The CGP covers any site one acre and above, including smaller sites that are part of a larger common plan of development or sale. The permit requires operators of the construction sites to use stormwater controls and develop stormwater pollution prevention plans to minimize the discharge of sediment and other pollutants associated with construction sites in stormwater runoff. Failure of a construction site operator to implement an adequate stormwater pollution prevention plan is a violation of the federal CGP, or similar state general permits as applicable, and can carry with it significant consequences including, for example, an enforcement action, massive civil and/or criminal penalties (including fines per day per violation), coverage termination, revocation and reissuance, or modifications or denial of a renewal application.

Accordingly, construction site operators are under increasing accountability for the implementation and maintenance of stormwater pollution prevention plans. As mentioned above, one of the technologies which has demonstrated the ability to achieve significant reduction in NTUs is polymer clarification. In this regard, presently, the Best Management Practice (BMP) utilized in the construction industry for the regulation and monitoring of stormwater is to install non-portable, non-self-contained filtration devices on the construction site. BMPs are directed at compliance with minimal state and/or federal regulations.

Typically, a water track or ditch is formed in the earth and bags containing a polymeric filter material are placed along the track. In an ideal application, as raw stormwater flows down the track, the raw water flows through and contacts the polymeric filter material and the filtering material cleans the water by filtering out undesirable impurities and contaminants. When the polymer mixes with the raw water, the polymer binds to the contaminants forming larger particles that should settle to the bottom or should be filtered out through other mechanical means, such as a jute yarn netting.

However, conditions on construction sites are rarely ideal. For example, harsh weather conditions can interfere with the filtration of raw water by the method described above. When the temperatures are at or below freezing, the water in the track or ditch also freezes preventing any water filtration from occurring. Because these non-portable filtration devices are not protected from such harsh environmental conditions, the filter track is susceptible to being covered by snow, ice and other debris, which can impair and even prevent water filtration from occurring.

And even if environmental conditions are ideal, the BMP non-portable filtration systems described above suffer from a number of other disadvantages. It is not uncommon that such filtration systems are improperly constructed so that optimal filtration cannot occur and, thus, the construction site operator could fail, for example, to meet minimal standards with respect to turbidity limits. Also, poorly maintained BMPs can result in significant quantities of sediment being discharged into the environment. Rarely do current BMPs facilitate optimal use of the filter material. This is true, for example, because of inadequate control of water flow through the filtering system.

Such non-portable filtration devices have other significant limitations with respect to the size of the construction site that it can accommodate. Typical non-portable, on-site filtration systems are problematic, for example, because often there is more than one area of the construction site which requires water filtration, so more than one non-portable filtration device must be installed for each distinct area. This, of course, is a costly endeavor and requires additional oversight and routine maintenance. Multiple, non-portable, on-site filtration device are also undesirable because they take up large areas of land, which can interfere with the construction activities. For example, a typical filtration ditch that can accommodate about 25 acres of land would likely include several stages, the first stage being about 8 feet wide, 6 feet deep and 10 feet long and ultimately graduating into a stage that is 8 feet wide, 2 feet deep and 30 feet long. The size of the non-portable filtration device continues to increase proportionately to the area of the construction, or other earth-moving, site and the concomitant amount of water requiring treatment.

The need to efficiently and effectively implement and maintain water pollution prevention programs is not limited to the construction and development industry. Operators of other types of earthwork projects where there is soil and environmental disturbance can benefit from the implementation and use of more effective and convenient ways to control on-site water pollution.

It would represent a significant improvement in the art to provide an apparatus and method to facilitate water filtration on-site, wherein such filtration apparatus would be mobile to accommodate any size construction site and the apparatus further would provide shelter from harsh environmental conditions to facilitate optimal water filtration, which would provide improved opportunity for exceeding applicable state and federal regulations.

BRIEF DESCRIPTION OF THE FIGURES

The invention may be understood by reference to the following description taken in conjunction with the figures. The figures are not necessarily to scale, emphasis instead being placed upon illustrating the principles of the invention.

DETAILED DESCRIPTION OF PREFERRED EMBODIMENTS

The figures illustrate exemplary mobile water filtration apparatus for transportation to, and operation at, on-site soil and environmental disturbances operations for the removal of contaminants from raw water at the site. As used herein, "contaminants" include, for example, soil particles such as clay, sand and silt that settle at the bottom of a body of water and those contaminants that may be attached to the particles, such as nitrogen and phosphorus nutrients, metals and hydrocarbons. As used herein, the term "raw water" is water taken from the environment and the term "treated water" refers to water that has had a desired amount of contaminants removed therefrom, depending upon applicable water quality standards.

The apparatus and method described herein may be used for on-site soil and environmental disturbances which include, for example, construction of residential, non-residential, commercial and institutional buildings and heavy and civil engineering construction buildings, such as utility systems construction (water and sewer lines, oil and gas pipelines, power and communication lines), land subdivision, highway, street, and bridge construction, and other heavy and civil engineering construction. Most broadly any activity involving moving and remodeling of earth may implement the described mobile water filtration apparatus and method of using same.

Figure 1:
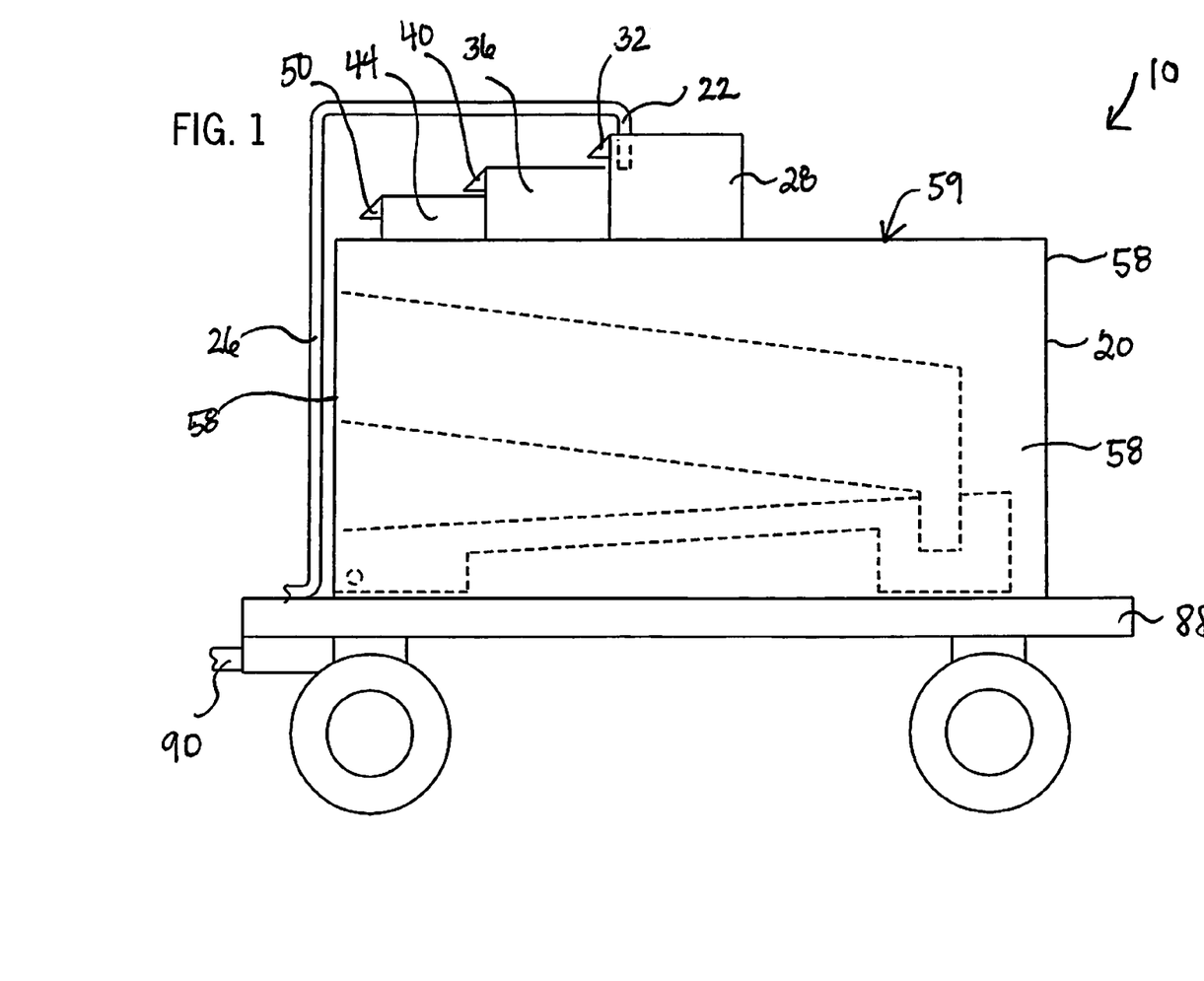
FIG. 1 shows an exemplary mobile water filtration apparatus having three settling tanks.

As shown in FIG. 1, the water filtration apparatus 10 includes a portable filtration apparatus platform 20. As used herein, a platform is any conveyance that can be used to transport the water filtration apparatus to and from a site. For example, the platform could be a trailer having an attachment point for mounting the platform to a motor vehicle. The platform could also be a container which, for example can be placed on the flatbed of a flatbed truck for transportation, as shown, for example in FIG. 1. While trailers and containers are described, the platform can be any structure which is capable of supporting the mobile water filtration apparatus and which is moveable, or can be adapted to be moveable, for example via a motor vehicle. Platforms may be made of metal, plastic, pre-cast concrete, for example, or any other material that is suitable depending upon the specific application.

The portability of the platform increases the versatility of the water filtration apparatus, including those embodiments described herein. Portability is desirable, among other reasons, because it allows transport of a complete and self-contained water filtration apparatus for immediate use on site. Portability also permits the use of only one water filtration apparatus that can accommodate all of the water filtration required at any earth-moving and remodeling site, regardless of the size of the site. For example, one when area of such a site has been accessed and the raw water filtered, the mobile water filtration apparatus may be moved to another distinct area of the site needing filtration of raw water. This process would continue through the duration of the earth moving and remodeling project in order to comply with applicable state and federal regulations regarding filtration of raw water on such sites. When the work on site is completed, the mobile water filtration apparatus may be moved to the next site for use. Of course, one of skill in the art will recognize that the water filtration apparatus described herein may be installed both above and below ground as necessary to suit particular on-site needs. For example, in certain applications, such as municipal yard work or material storage yard where there is continuous exposed stock piles of soil, dirt, clay and/or solid waste materials from waste water treatment centers or vacuum truck and street sweeper waste, it may be desirable to install the self-contained water filtration apparatus 10 underground.

The enclosure may be accessible by an operator for set-up, routine maintenance and cleaning and any repair of the water filtration apparatus which might be necessary. For example, the enclosure may include a door or other entry, as shown, for example in FIG. 7, which permits an operator access to the interior of the enclosure. Any structure permitting access to the interior of the enclosure, whether the enclosure is installed above or below ground, would be suitable.

Figure 2:
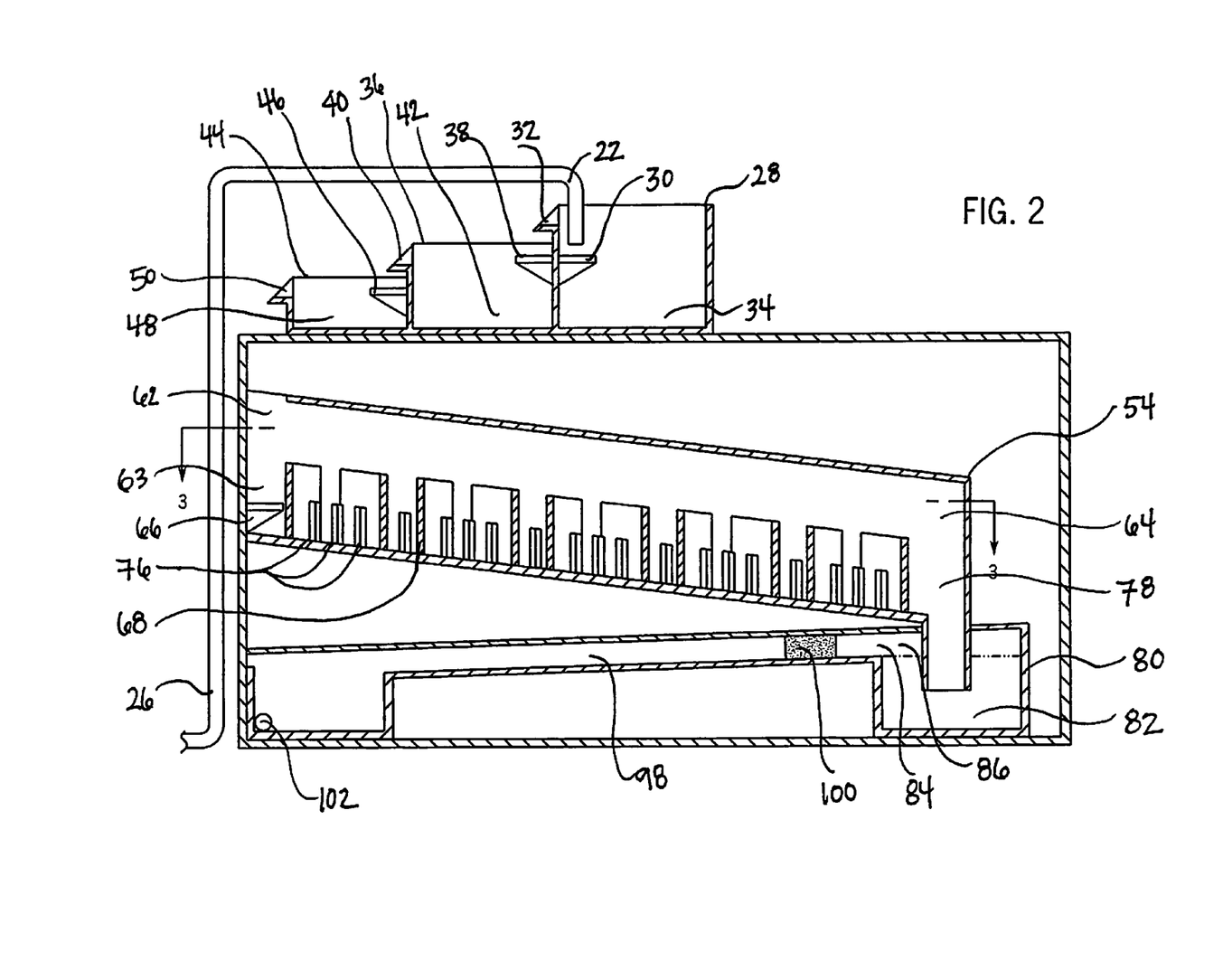
FIG. 2 is a side view cross-section of the apparatus of FIG. 1.
Figure 7:
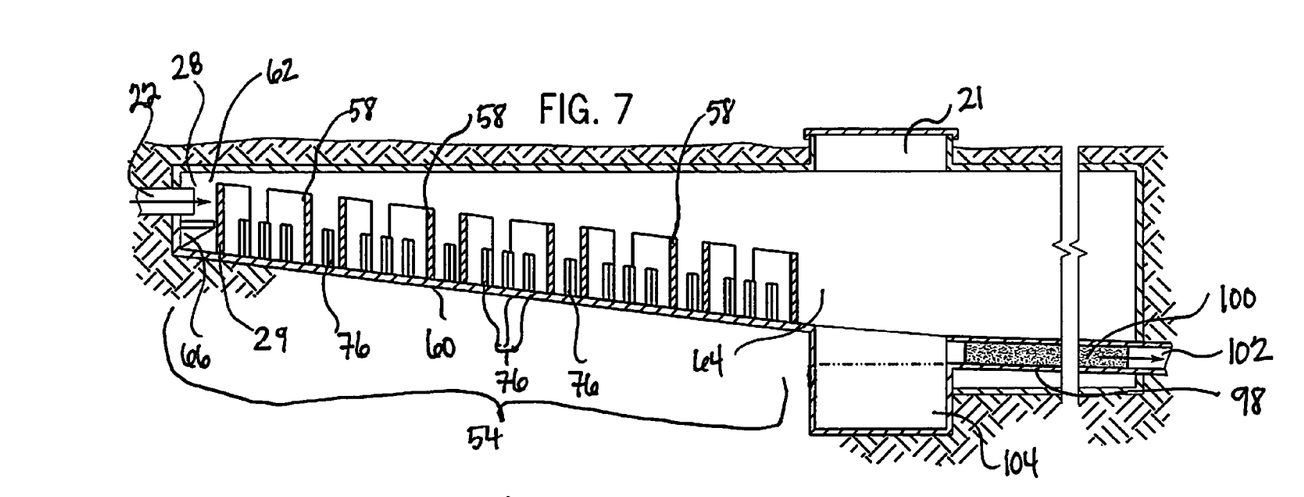
FIG. 7 is a side view cross-section of an embodiment of the filtration apparatus installed in-ground.

Referring next to FIGS. 1 and 2, mobile water filtration apparatus 10 may include a first settling tank 28 which is secured with respect to platform 20. In the example where the platform is a container, or other such enclosure, first settling tank may 28 be mounted with respect to platform 20 and on an exterior surface of the container. First settling tank 28 could, of course, be mounted within such an enclosure, as shown in the embodiment of FIG. 7, where settling tank 28 is located at an upper end 62 of a sloped trough 54, which is described in detail below.

First settling tank 28 includes a flocculating agent. The flocculating agent may be placed in a first holder 30 which permits water to flow through it, such as a mesh wire basket. A flocculating agent is a substance which, when added to a solution, induces flocculation, or coalescence, of contaminants and sedimentation of precipitates. First holder 30 has the flocculating agent positioned so that it is in the flow path of the raw water which is moved from a raw water source to first settling tank 28. The water may be pumped from the water source and moved through a conduit 26 to a water inlet 22 which feeds water into first settling tank 28. Once raw water flows into first settling tank 28 and contacts the flocculating agent, the flocculating agent flows with the water through first holder 30.

The flocculating agent may be any suitable non-ionic, anionic or cationic flocculating agent. The choice of flocculating agent is influenced by site-specific variables such as soil lithology and water chemistry on-site. It is preferred that the flocculating agent is a water-soluble, anionic polymeric flocculating agent such as that sold by Applied Polymer Solutions, Inc. of Norcross, Ga. under the tradename Floc Log®. The Floc Log® is a powder product in the form of a block of anionic polyacrylamide co-polymer. When the raw water flows across the flocculating agent, the Floc Log® swells and then the anionic polymer is released and is dissolved into the water. When the raw water including contaminants such as clays, soil particles or other small charged particles contacts and mixes with the flocculating agent, the dissolved polymer attaches and binds to the contaminants thereby forming a larger mass of dissolved flocculating agent and contaminants. This is sometimes referred to as a floc, which settles to the bottom of the tank.

To reduce the initial content of suspended solids and other debris in the raw water, first settling tank 28 further includes a lower portion 34 into which sediment settles. In first settling tank 28, heavy suspended solids and other heavy debris may independently settle to lower portion 34. Additionally, sediment, such as contaminants which have come into contact with and aggregated to the flocculating agent may settle to lower portion 34 of first settling tank 28. When necessary (for example, due to build-up in the settling tank) the flocculated material can be manually removed from the settling tank.

As shown in the embodiments of FIGS. 1 and 2, to facilitate optimal filtration, more than one settling tank may be used. The operator will choose a suitable number of settling tanks considering at least the quantity of raw water to be filtered, the quality of such raw water and the relevant water quality guidelines. The amount of flocculating agent in the system is also variable, but any effective amount which induces contaminants to aggregate and enhances sedimentation of precipitates is suitable. The amount of flocculating agent necessary will also depend upon the nature and quality of the raw water being filtered and other on-site soil conditions.

FIGS. 1 and 2 show second and third settling tanks, 36, 44 respectively. In such embodiment, second settling tank 36 is positioned adjacent to and below first settling tank 28 to facilitate a gravity-induced flow of the flocculating-agent-containing water from first settling tank 28 to second settling tank 36. Second settling tank 36, like first settling tank 28, includes a second holder 38 having a flocculating agent in the water flow path. As water flows from first settling tank 28 to second settling tank 36, for example via a first spillway 32 or other conduit, the water flows across the flocculating agent in second settling tank 36, which may at least in part be contained within second holder 38. Second settling tank 36 further includes a lower portion 42 where flocculated material including contaminants and solids may settle.

From second settling tank 36, the flocculating-agent-containing water may flow into yet a third settling tank 44 which also includes a third holder 46 having a flocculating agent in the water flow path. In such embodiment, third settling tank 44 is positioned adjacent to and below second settling tank 36 to facilitate gravity-induced flow of the flocculating-agent-containing water from second settling tank 36 to third settling tank 44. As water flows from second settling tank 36, for example via a second spillway 40 or other conduit, the water flows across the flocculating agent in third settling tank 44. Third settling tank 44 further includes a lower portion 48 where flocculated material including contaminants and solids may settle.

Where only one settling tank is used, which may be the case, for example, when water filtration apparatus 10 is installed for underground use, the flocculating-agent-containing water flows from first settling tank 28 and into a sloped trough 54 which is secured with respect to platform 20. In the embodiment shown in FIGS. 1 and 2, for example, and wherever more than one settling tank is used, a further settling tank may be positioned at upper end 62 of sloped trough 54. If there is more than one settling tank, such as that described above, flocculating-agent-containing water from the last in the series of settling tanks flows therefrom and into sloped trough 54. In such embodiment, water may flow from the last in the series of settling tanks into a further settling tank 63 at upper end 62 of sloped trough 54. A trough includes any conduit, drain, channel or waterway through which water may flow. Sloped trough 54 includes an axis 56 which defines a flow direction.

Sloped trough 54 has an upper end 62 which receives flocculating-agent-containing water and a lower end 64. Optionally, sloped trough can include a holder 66 at sloped trough upper end 62 and holder 66 includes a flocculating agent therein to accommodate site-specific conditions.

Where under-ground installation of the portable water filtration apparatus is desired, the first settling tank 28 may be mounted within and with respect to platform 20. Platform 20 may include a door, or other entry 21 to permit access, as shown in FIG. 7. In such embodiments where a settling tank is positioned at upper end 62 of sloped trough 54, settling tank may include a settling tank wall 29 that is transverse to axis 56 and extends from one sloped trough sidewall to the oppositive sloped trough side wall. Here, water flowing into settling tank at upper end 62 of sloped trough 54 will flow over settling tank wall 29 and into sloped trough 54. Holder 66 is positioned within settling tank portion at upper end 62 of sloped trough 54.

In a preferred embodiment, sloped trough 54 is pitch-adjustable to a selected angular position to ensure optimal filtration conditions. For example, where more contact time between the flocculating agent and contaminants is desirable, an operator can manually adjust the pitch of sloped trough 54 to decrease the pitch, thus slowing the flow rate of the water. Conversely, where less contact time between the flocculating agent and contaminants is desirable, an operator could manually adjust trough 54 to increase the pitch, thus increasing the flow rate of the water. Although manual adjustment is discussed, it is understood that automatic, mechanical adjustment means are within the spirit and scope of the disclosure. Sloped trough 54 can be secured with respect to platform 20 and adjusted for a desired pitch in any suitable manner. For example, sloped trough 54 may be conventionally secured to platform 20 using bolts (not shown) in which case an operator would manually adjust the pitch by bolting the sloped trough in a higher or lower notch. Sloped trough 54 also may be adjustable by use of lifting jacks, such as bottle jacks (which use a hydraulic cylinder and are often manually operated), inflatable jacks, ratchet jacks, scissor jacks, toe or service jacks, and transmission jacks, or other manual and hydraulic lifts.

Figure 3:
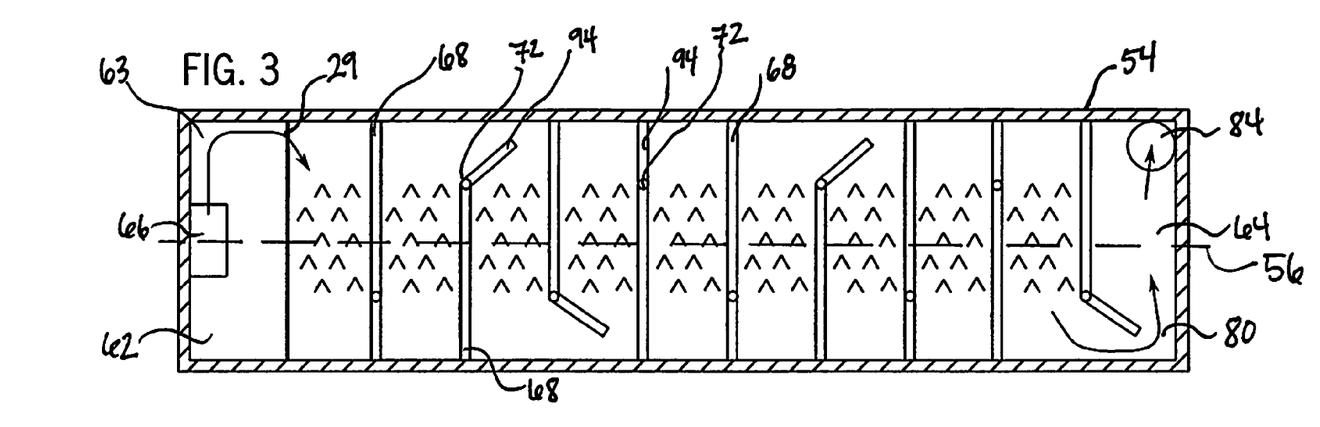
FIG. 3 is a top view of a sloped trough taken along line 3-3 of FIG. 2.
Figure 4:
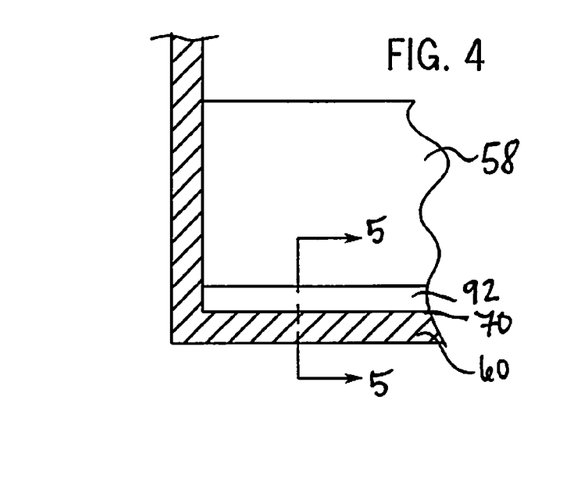
FIG. 4 is a partial view of a gate having a gasket.
Figure 5:
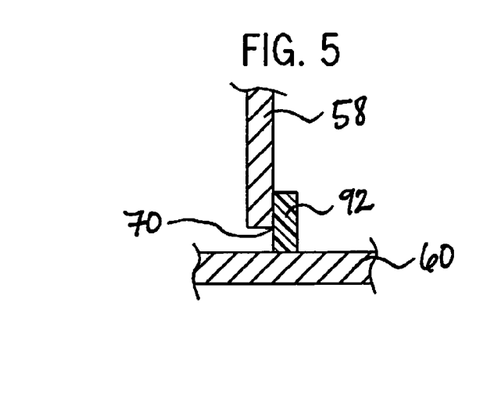
FIG. 5 is a section view taken along line 5-5 of FIG. 4 and shows an end view of a gate and gasket thereon.

Next referring to FIGS. 2 and 3, sloped trough 54 has a plurality of spaced-apart walls 68 between the upper 62 and lower 64 ends of sloped trough 54. Walls 68 are transverse to axis 56 which defines a serpentine flow path between upper and lower ends, 62, 64 respectively. The flow path of sloped trough 54, being greater than axis 56, facilitates optimal flow conditions and optimal time for the flocculating agent to contact and mix with the contaminants in the water. Each of walls 68 may be moveable from an open to a closed position to facilitate optimal flow speed of the flocculating-agent-containing water. For example, if the quality of the raw water to be filtered requires a greater mixing time between the flocculating agent and the contaminants, then one or more of walls 68 may be moved to a closed position to slow the flow of the water and thereby increase contact time between the flocculating agent and the contaminants. Conversely, where conditions warrant, if less contact time between the flocculating agent and the contaminants is necessary, one or more of walls 68 may be moved to an open position to increase the flow of the water through the apparatus. Each wall 68 can include a sealing member 92, such as a gasket, on a bottom wall surface 60 such that sealing member 92 is positioned between bottom 60 of sloped trough 54 and the corresponding wall 68 to prevent water from flowing thereunder. Flow of water through sloped trough 54 may preferably be controlled such that the water passing therethrough does not flow over the spaced-apart walls, but rather it flows through the flow path that is defined by walls 68. Preventing water from flowing over spaced-apart walls 68 promotes turbulent mixing of the contaminated water with flocculating agent, as well as optimal mixing time for the contaminated water to contact the flocculating agent.

To facilitate easy adjustment of the walls, the walls may be hingedly mounted with respect to the sloped trough, for example with a conventional piano hinge or the like. The walls could also be attached to the sloped trough using stainless steel pop rivets, for example. Any attachment of the walls to the sloped trough which allows for movement of the walls would also be suitable.

Walls 68 can be moved together, or select walls may be moved as necessary to control the flow of the water through the sloped trough. Walls 58, for example, may be serially connected by a louvre shutter mechanism having a pivot rod connector which connects the walls and movement of the pivot rod connector controls movement of the walls from an open position to a closed position. Alternatively, the walls could be manually moved one at a time to adjust for optimal flow conditions. Any mechanism that moves the walls, whether in series or individually, would be suitable.

Figure 6:
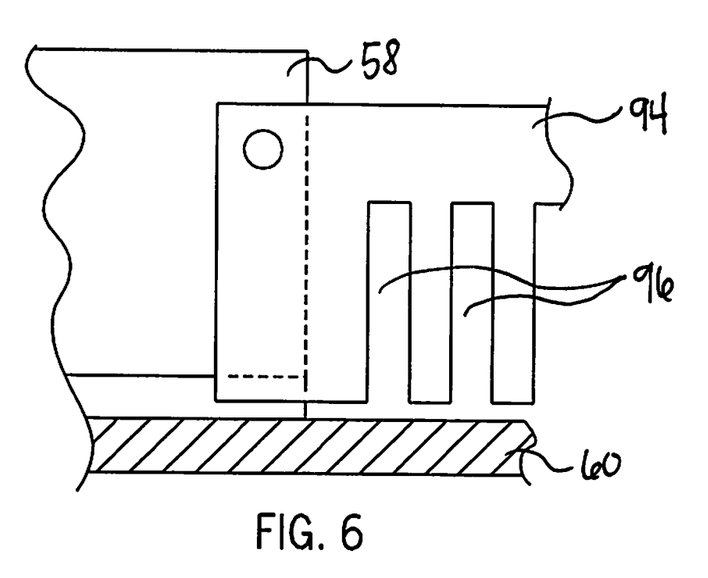
FIG. 6 is a partial view of a gate having a plurality of openings.

In embodiments each wall 68 has a gate 94 at an end 72 of wall 68. As shown in FIG. 6, each gate 94 may define at least one opening 96 through which water flows. In embodiments where walls 68 are not moveable, gate opening 96 will facilitate flow of water through sloped trough 54. In a preferred embodiment, opening 96 is elongate and the flow of water through one or more elongate opening(s) 96 creates a circulation similar to the Venturi effect. The Venturi effect is the reduction in water pressure and consequent increase in flow velocity that results when the water flows through the constricted elongate opening. The Venturi effect tends to causes rotation of the water and flocculating agent about the area of opening 96, which facilitates turbulent mixing of the flocculating agent and contaminants in the water. The shape and size of opening 96 may vary so long as the opening facilitates mixing of the flocculating agent with the contaminants in the water.

Each gate 94 is adapted to be moved to an open position facilitating free-flow of flocculating-agent-containing water through the channels, as shown for example in FIG. 3. Alternatively, gate 94 may be moved to a closed position to slow flocculating-agent-containing water flow, which, in turn, facilitates contact between flocculating agent and contaminants in the water, also as shown in FIG. 3. Gates 94 may be integral to a wall 68 or mounted with respect to a wall 68 in any suitable manner which facilitates movement of gate 94 from an open position to a closed position. For example, gate 94 may be hingedly attached to an end of the wall whereby gate 94 is adapted to swing open and closed. Gate 94 could also be recessed with respect to a corresponding wall 68 when gate 94 is in an open position and each gate 94 could be moveable to extend away from a corresponding wall 68 when gate 68 is in a closed position. Alternatively, rather than moving wall 68 of gate 94, flow of water may be controlled, for example, by restricting water flow through opening 96 by increasing or decreasing the size of the opening. For example, a moveable, shade-like barrier could be used to vary the size of the opening.

Figure 8:
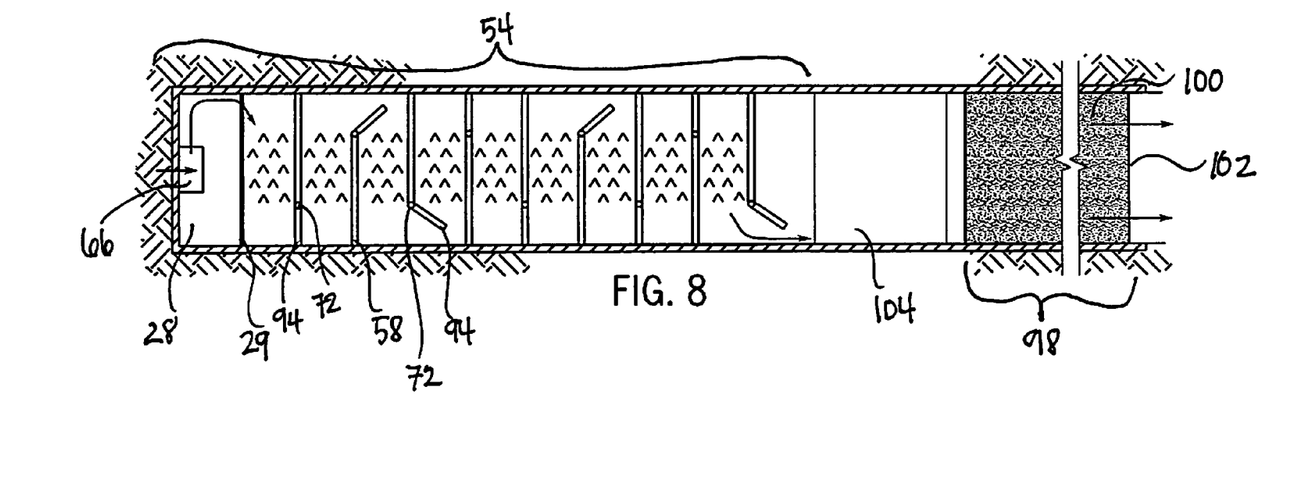
FIG. 8 is a top plan view of the filtration apparatus of FIG. 7.

Next, as best shown in FIGS. 2, 3 and 8, sloped trough 54 also has a plurality of agitators 76 between walls 68 and in the flow path. As shown, in an embodiment, agitators 76 are arranged in a staggered pattern. Agitators 76 obstruct flocculating-agent-containing water flow which facilitates contact between the flocculating agent and contaminants in the water. In an exemplary embodiment, agitators 76 are made of a solid material, such as metal or hard plastic. Agitators 76 could be made of other suitable materials such as stone or wood. As shown in FIGS. 2 and 3, the agitators can extend transversely with respect to bottom 60 of sloped trough 54 and have a v-shaped horizontal cross section. Agitators 76 may have other suitable shapes and arrangements between spaced-apart walls 68 of sloped trough 54 so long as such shapes and arrangements obstruct or slow flocculating-agent-containing water flow to facilitate optimal contact between the flocculating agent and contaminants in the water.

More than one sloped trough 54 may be used as needed based on the quantity and quality of the raw water to be filtered and the site conditions. Where more than one sloped trough 54 is used, water flows from a first sloped trough and into an adjacent sloped trough that is positioned substantially transverse, i.e., in a cross-wise direction, to the first sloped trough, and so on.

It is preferred that at least sloped trough 54 be protected from the environment. Of course, additional parts or even the entire mobile water filtration apparatus could be shielded from the environment. In the examples where a platform is a container having at least four sidewalls 58 and a top wall 59 which protects the interior of the container from the environment, sloped trough 54 would be mounted with respect to and on the interior of the container. One advantage of enclosing at least sloped trough 54 from the environment is that the water filtration will not be impeded or possibly even completely interrupted by harsh weather conditions. Such a mobile water filtration apparatus will be operable during the colder fall and winter months where temperatures can be as low as 32° F., or even lower. Additionally, by shielding at least sloped trough 54 from the environment, ice, snow, and other debris will not accumulate in the flow path and interrupt the flow of water. Optionally, a heating element could be used with the mobile water filtration apparatus 10 to ensure that conditions are suitable for free flow of water and filtration. The heating element may be used to keep at least all parts of sloped trough 54 warm to allow for free-flow of water therethrough. Additionally, increased operating temperatures may enhance the effectiveness of the flocculating agent.

From sloped trough 54 upper end 62, the flocculating-agent-containing water then flows from lower end 64 of the sloped trough 54 and into a terminal settling tank 80, which may be secured with respect to platform 20, as shown, for example, in FIGS. 2 and 3. Terminal settling tank 80 includes a lower portion 82 into which flocculated material settles and an outlet 84 along a terminal settling tank upper portion 86 through which treated water flows. More than one terminal settling tank 80 may be used in series where water-quality conditions and applicable water-quality regulations warrant. Where more than one terminal settling tank 80 is used, the last terminal settling tank 80 in the series includes an outlet along a terminal settling tank upper portion through which treated water flows.

The system may also include a filtering tray 98 secured with respect to platform 20 which receives treated water from terminal settling tank outlet 84. Filtering tray 98 may include jute, cotton or any other suitable organic or inorganic mesh-like material through which the treated water flows and such material catches additional remaining contaminants in the water. In preferred embodiments, filtering tray 98 includes jute netting 100 which may have a flocculating agent thereon to aid in collecting contaminants. Filtering tray 98 has an water outlet 102 through which treated water flows and may be returned to the environment.

For underground or above-ground installations, sloped trough 54 and settling tank, or also filtering tray, may be housed within one platform wherein sloped trough 54 and at least one settling tank, and optionally a filtering tray or additional settling tanks, are arranged in lateral series. As shown, for example in FIGS. 7 and 8, platform 20 may include inlet 22 for receiving raw, contaminated water. From inlet 22, water is moved through sloped trough 54, as described above. Water flows through sloped trough 54 and into a settling tank 104 (like terminal settling tank 80 described above) which is located at lower end 64 of sloped trough 54. Sloped trough 54 would include a flocculating agent at upper end 62 where raw storm water would first contact the flocculating agent. The flocculating agent may be held, for example, in holder 66 such as those previously described herein. Optionally, at upper end 62 of sloped trough 54, first settling tank 28 may be positioned. Lower end 64 of sloped trough 54 may include settling tank portion 104 where heavier, flocculated sediment would fall to the bottom of the settling tank 104. Treated water would rise to the top of settling tank 104 and continue to flow therefrom into filtering tray 98, which may include jute yarn netting, or some other suitable type of a mechanical filtration device. Treated water would continue to flow toward an outlet portion 102 and therefrom the treated water would return to the environment, including, for example, to water sources such as streams and ponds.

Although use of one platform has been described, more than one platform 20 may be used. It may be desirable, for example, to use more than one platform in underground installation applications, although more than one platform could also be used in above-ground applications. For example, first and second platforms could be used and such platforms would be positioned at predetermined grades. Sloped trough 54 may be positioned within a first platform. And upper end 62 of sloped trough 54 may, for example, include intake 22 for receiving raw storm water. Sloped trough 54 would include a flocculating agent at upper end 62 where raw storm water would first contact the flocculating agent. The flocculating agent may be held, for example, in a holder such as those previously described herein. Optionally, at upper end 62 of sloped trough 54, first settling tank 28 may be positioned. Lower end 64 of sloped trough 54 may include settling tank portion 104 where heavier, flocculated sediment would fall to the bottom of the settling tank 104. Treated water would rise to the top of settling tank and continue to flow therefrom into the second platform through a suitable conduit. The second platform may include, for example, filtering tray 98, which may include jute yarn netting 100, or some other suitable type of a mechanical filtration device. Treated water would continue to flow toward an outlet portion 102 of second platform and therefrom the treated water would return to the environment.

The mobile water filtration may be operated, for example, as described herein. An operator first tows the mobile water filtration apparatus to the construction site. The operator then locates the mobile water filtration apparatus near a source of raw water on the site. The apparatus may be located above ground or in-ground as conditions and other operating requirements warrant. An electrical supply is established for facilitating moving the raw water from the source to the filtration apparatus. A conduit is formed for transporting the raw water from the source to the apparatus. The operator places flocculating agent in the settling tank, or in each of the settling tanks if there is more than one. Where there is only one settling tank, flocculating agent is placed at upper end 62 of sloped trough 54. Where more than one settling tank is used, the operator may also place a flocculating agent at the top end of the sloped trough, if necessary. Water is pumped from the source through the conduit to the first settling tank. The water flowing into the first settling tank contacts the flocculating agent and then the flocculating agent and the water continue to flow through the apparatus, first flowing together to the upper end of the sloped trough. Thereafter, the water flows through the serpentine flow path formed by the plurality of walls. The water is controlled so that it does not flow over the plurality of walls. As the water flows through the flow path, the water may flow through holes defined in the gates if the gates are in a closed position. The water also flows and circulates in a turbulent manner about the plurality of agitators between the walls of the sloped trough. The flocculating-agent-containing water continues to flow from the lower portion of the sloped trough into a terminal settling tank where sediment and flocculated material settles to the bottom and the treated water rises to the top and flows through the outlet in the upper portion of the terminal settling tank. If desired, the water may flow from the terminal settling tank outlet to a filtering tray which collects remaining flocculated material and debris. Thereafter, the treated water is moved from the water filtration apparatus and is returned to the environment.

While the principles of this invention have been described in connection with specific embodiments, it should be understood clearly that these descriptions are made only by way of example and are not intended to limit the scope of the invention.

The invention claimed is:

1. A mobile water filtration apparatus for transportation to, and operation at, on-site soil and environmental disturbances operations for removal of contaminants from raw water at the site comprising:
    a portable filtration apparatus platform;
    a first settling tank secured with respect to the platform, wherein the settling tank includes a holder having a flocculating agent therein in the raw water flow path and the flocculating agent flows with the water through the holder, the first settling tank further including a lower portion into which sediment settles;
    a sloped trough secured with respect to the platform including an axis defining a flow direction, the trough comprising:
        an upper end which receives the flocculating-agent-containing water;
        a lower end;
        a plurality of spaced-apart walls between the upper and lower ends transverse to the axis which define a serpentine flow path between the upper and lower ends that is greater than the axis,
        a plurality of agitators between the walls and in the flow path which obstruct flocculating-agent-containing water flow to facilitate contact between flocculating agent and contaminants in the water; and
    a terminal settling tank secured with respect to the platform which receives flocculating-agent-containing water from the trough lower end, the terminal settling tank including a lower portion into which sediment settles and an outlet along a terminal settling tank upper portion through which treated water flows.

2. The mobile water filtration apparatus of claim 1 wherein the platform is a trailer having an attachment point for mounting the platform to a motor vehicle.

3. The mobile water filtration apparatus of claim 1 wherein the platform is a container enclosing at least the sloped trough.

4. The mobile water filtration apparatus of claim 1 further including at least a second settling tank secured with respect to the platform and positioned lower than the first settling tank, the second settling tank receiving flocculating-agent-containing water from the first settling tank, and wherein the second settling tank includes a holder having a flocculating agent therein in the raw water flow path and the flocculating agent flows with the water through the holder, the second settling tank further including a lower portion into which flocculated material and sediment settles.

5. The mobile water filtration apparatus of claim 1 wherein the sloped trough is pitch-adjustable.

6. The mobile water filtration apparatus of claim 1 further including a plurality of sloped troughs.

7. The mobile water filtration apparatus of claim 1 wherein each wall is moveable with respect to the sloped trough to adjust for desired rate of water flow.

8. The mobile water filtration apparatus of claim 7 wherein a sealing member is disposed between a base portion of each wall and a bottom portion of the sloped trough thereby obstructing flow of flocculating-agent-containing water therebetween.

9. The mobile water filtration apparatus of claim 1 wherein each wall includes a gate being adapted to move from an open position facilitating free-flow of flocculating-agent-containing water through the channels to a closed position obstructing flocculating-agent-containing water flow to facilitate contact between flocculating agent and contaminants in the water.

10. The mobile water filtration apparatus of claim 9 wherein each gate is moveable with respect to a corresponding wall.

11. The mobile water filtration apparatus of claim 9 wherein each gate defines at least one opening through which flocculating-agent-containing water moves when said gate is in the closed position to obstruct flocculating-agent-containing water flow to facilitate contact between flocculating agent and contaminants in the water.

12. The mobile water filtration apparatus of claim 11 wherein the opening is elongate.

13. The mobile water filtration apparatus of claim 1 wherein the agitators are arranged in a staggered pattern with respect to one another to facilitate contact between the flocculating agent and contaminants in the water.

14. The mobile water filtration apparatus of claim 1 wherein each of the plurality of agitators has a v-shaped horizontal cross section.

15. The mobile water filtration apparatus of claim 1 wherein the flocculating-agent is an anionic polymer.

16. The mobile water filtration apparatus of claim 1 further including a filtering tray having a jute netting secured with respect to the platform which receives treated water from the terminal settling tank outlet and the treated water flows through the filtering tray and jute netting to facilitate collecting of contaminants.

17. The mobile water filtration apparatus of claim 16 wherein the jute netting includes a flocculating agent.

18. The mobile water filtration apparatus of claim 1 wherein the apparatus is adapted to be installed below ground.

19. The mobile water filtration apparatus of claim 1 wherein the apparatus is adapted to be installed above ground.

20. A mobile water filtration apparatus for transportation to, and operation at, on-site soil and environmental disturbances operations for removal of contaminants from raw water at the site comprising:
    a portable filtration apparatus platform;
    a first settling tank secured with respect to the platform, wherein the settling tank includes a holder having a flocculating agent therein in the raw water flow path and the flocculating agent flows with the water through the holder, the first settling tank further including a lower portion into which sediment settles;
    a sloped trough secured with respect to the platform including an axis defining a flow direction, the trough comprising:
        an upper end which receives the flocculating-agent-containing water;
        a lower end;
        a plurality of spaced-apart walls between the upper and lower ends transverse to the axis which define a serpentine flow path between the upper and lower ends that is greater than the axis;
        a plurality of gates, each gate corresponding to one of the plurality of spaced-apart walls, wherein each gate defines an opening through which flocculating-agent-containing water flows; and a plurality of agitators between the walls and in the flow path which obstruct flocculating-agent-containing water flow to facilitate contact between flocculating agent and contaminants in the water; and a terminal settling tank secured with respect to the platform which receives flocculating-agent-containing water from the trough lower end, the terminal settling tank including a lower portion into which sediment settles and an outlet along a terminal settling tank upper portion through which treated water flows.

21. The mobile water filtration apparatus of claim 20 wherein each gate is adapted to move from an open position facilitating free-flow of flocculating-agent-containing water through the channels to a closed position obstructing flocculating-agent-containing water flow to facilitate contact between flocculating agent and contaminants in the water.

22. A method of removing contaminants from raw water and returning treated water having contaminants removed therefrom to the environment comprising the steps of:
 (a) moving contaminant-containing raw water from a contaminant-containing raw water source to a water inlet of a water filtration apparatus;
 (b) moving contaminant-containing raw water from the water inlet through a flocculating agent containing holder mounted with respect to the water filtration apparatus;
 (c) moving flocculating-agent-containing water from the holder to a sloped trough having a plurality of spaced-apart walls defining a serpentine flow path extending between a sloped trough upper end and sloped trough lower end;
 (d) mixing the flocculating-agent-containing water by moving the flocculating-agent-containing water through the serpentine flow path and contacting the flocculating-agent-containing water with a plurality of agitators in the flow path;
 (e) controlling the flow of water through the water filtration apparatus by moving a gate portion of at least one of the plurality of spaced-apart walls from an open to a closed position, whereby opening the gate portion increases water flow and mixing of the contaminant-containing raw water with the flocculating agent and closing the gate portion decreases water flow and mixing of the contaminant-containing raw water with the flocculating agent;
 (e) passing flocculating-agent-containing water from the sloped trough lower end to a settling tank having a lower portion into which sediment settles;
 (f) producing treated water in the settling tank and moving the treated water through an outlet in a settling tank upper portion;
 (g) returning the treated water to the environment.

23. The method of claim 22 further including the step of installing the water filtration apparatus below ground before moving contaminant-containing raw water from a contaminant-containing raw water source to a water inlet of a water filtration apparatus.

24. The method of claim 22 further including mixing the flocculating-agent-containing water by moving the flocculating-agent-containing water through a second sloped trough before passing the flocculating-agent-containing water to the settling tank.

25. The method of claim 22 further including the step of moving treated water to a filtration tray before the treated water is moved through the outlet in the settling tank upper portion and returned to the environment.

* * * * *